United States Patent [19]

Davis

[11] Patent Number: 4,834,338

[45] Date of Patent: May 30, 1989

[54] HIGH PRESSURE FLEXIBLE SEAT VALVE TRIM

[75] Inventor: James R. Davis, Marshalltown, Iowa

[73] Assignee: Fisher Controls International, Inc., Clayton, Mo.

[21] Appl. No.: 152,632

[22] Filed: Feb. 5, 1988

[51] Int. Cl.⁴ .......................... F16K 1/42; F16K 1/46
[52] U.S. Cl. ..................................... 251/171; 251/332
[58] Field of Search ..................... 251/171, 191, 332

[56] References Cited

U.S. PATENT DOCUMENTS

| | | | |
|---|---|---|---|
| 2,060,748 | 11/1936 | Roberts et al. | 251/332 |
| 3,327,991 | 6/1967 | Wallace | 251/332 X |
| 3,809,362 | 5/1974 | Baumann | 251/332 |
| 4,015,815 | 4/1977 | Leisner et al. | 251/171 X |

FOREIGN PATENT DOCUMENTS 262061  6/1949  Switzerland ..................... 251/332

OTHER PUBLICATIONS

Fisher Controls, "Design ES, EAS, and ESR Control Valve Bodies", Bulletin 51.1:ES, Sep. 1987, 2 pages.

Primary Examiner—Arnold Rosenthal
Attorney, Agent, or Firm—Marshall, O'Toole, Gerstein, Murray & Bicknell

[57] ABSTRACT

A fluid valve with improved valve trim for reliable fluid shut off in high pressure applications. The improved valve trim includes a flexible metal seat with a lip portion which flexes outwardly upon sealing contact with a valve plug seating surface. A deformable seal mounted in the seat is prevented from substantial outward movement by a rigid metal seal retainer and is squeezed outwardly around the plug seating surface as the seat lip portion flexes outwardly.

11 Claims, 2 Drawing Sheets

HIGH PRESSURE FLEXIBLE SEAT VALVE TRIM

FIELD OF THE INVENTION

This invention relates to fluid valves and more particularly to fluid sealing apparatus in fluid valves for providing a reliable shutoff of high pressure fluid.

BACKGROUND OF THE INVENTION

In many applications, such as in power plants, high temperature boiler feedwater systems require fluid valves having reliable valve fluid sealing components (i.e., valve trim) which is required to provide a tight fluid shutoff for long periods of time. Special problems arise in such environments in view of the high pressures and the high temperatures which can range from about 250° to about 450° Fahrenheit.

Presently available valves for such environments include complex shaped valve trim components which lead to costly manufacturing and time consuming and costly replacement during normal valve maintenance. Typically, fluid valves employ metal-to-metal seating for all general applications over a wide range of pressure drops and temperatures, and metal-to-TFE (tetrafluoroethylene) seating for more stringent shutoff requirements. An example of such a standard and optional seating is available in a design ES valve body made by Fisher Controls International, Inc. This commercially available fluid valve includes a valve trim having a valve plug seating against a seal ring formed of tetrafluoroethylene (TFE) which is located in a metal seal ring housing and held in place by a metal disk retainer. While such a configuration is acceptable for most conditions, it is desired to provide a fluid valve with improved valve trim components for reliable use under stringent high pressure and high temperature conditions.

In U.S. Pat. No. 3,809,362, there is described an improved valve trim for high pressure fluid valve use and wherein a deformable plastic insert seat ring is mounted on a seat ring housing and held in place by a seat ring retainer. The seat ring retainer includes a series of inwardly and outwardly formed surfaces facing opposite similarly shaped seat ring housing surfaces, and with the deformable plastic seat ring having a similar series of surfaces and located between the retainer and the housing. During valve closing, the valve plug compresses the deformable seat ring to stress the ring above the yield point and cause it to act like a liquid to enable the seat ring to deform and displace so as to establish a plastic-to-metal hydrostatic seal.

It is desired to provide a fluid valve having a valve trim which is capable of reliable operation under high pressure, high temperature conditions. It is also desired to provide such a valve trim which is more easily manufactured and at less cost than presently available units and which can be more easily and readily maintained during normal valve maintenance.

SUMMARY OF THE INVENTION

In accordance with the principles of the present invention, there is provided a fluid valve which includes a valve plug with an outwardly extending plug seating surface, a deformable sealing of resilient material, a seal ring housing with a flexible metal seat for holding the deformable seal ring, and a metal seal retainer surrounding the flexible metal seat and the seal. The seal retainer has a closely matching contour to the seal ring so as to hold the seal ring tightly in place and so that as the valve plug closes and engages the flexible metal seat, one portion of the metal seat flexes outwardly to squeeze the deformable seal inwardly against the valve plug. Outward movement of the seal during flexing of the rigid metal seat is prevented by the closely matching contour of the metal seal retainer.

This valve trim has the capability to produce a tight seal on assembly with no adjustment being required. The seal relaxes when the valve plug is opened and is squeezed inwardly against the valve plug to form a leak tight seal around the perimeter of the valve plug as the valve plug contacts the flexible metal seat. The plastic seal is preferably made of carbon-filled TFE, which allows repeated valve closings at temperatures up to 450° Fahrenheit.

A significantly advantageous feature of the present invention is that the fluid valve, and particularly the valve trim components are readily manufactured, assembled, and can easily be replaced during maintenance. In particular, during assembly of the valve trim, the deformable plastic seal is merely inserted into the flexible metal seat and the seal retainer placed in position to surround both the seal and the flexible metal seat without any adjustment of the position of the components.

BRIEF DESCRIPTION OF THE DRAWINGS

The features of this invention are set forth with particularity in the appended claims. The invention may be best understood by reference to the following description taken in conjunction with the accompanying drawings, in which like reference numerals identify like elements in the several figures and in which:

DETAILED DESCRIPTION OF THE INVENTION

Figure 1:
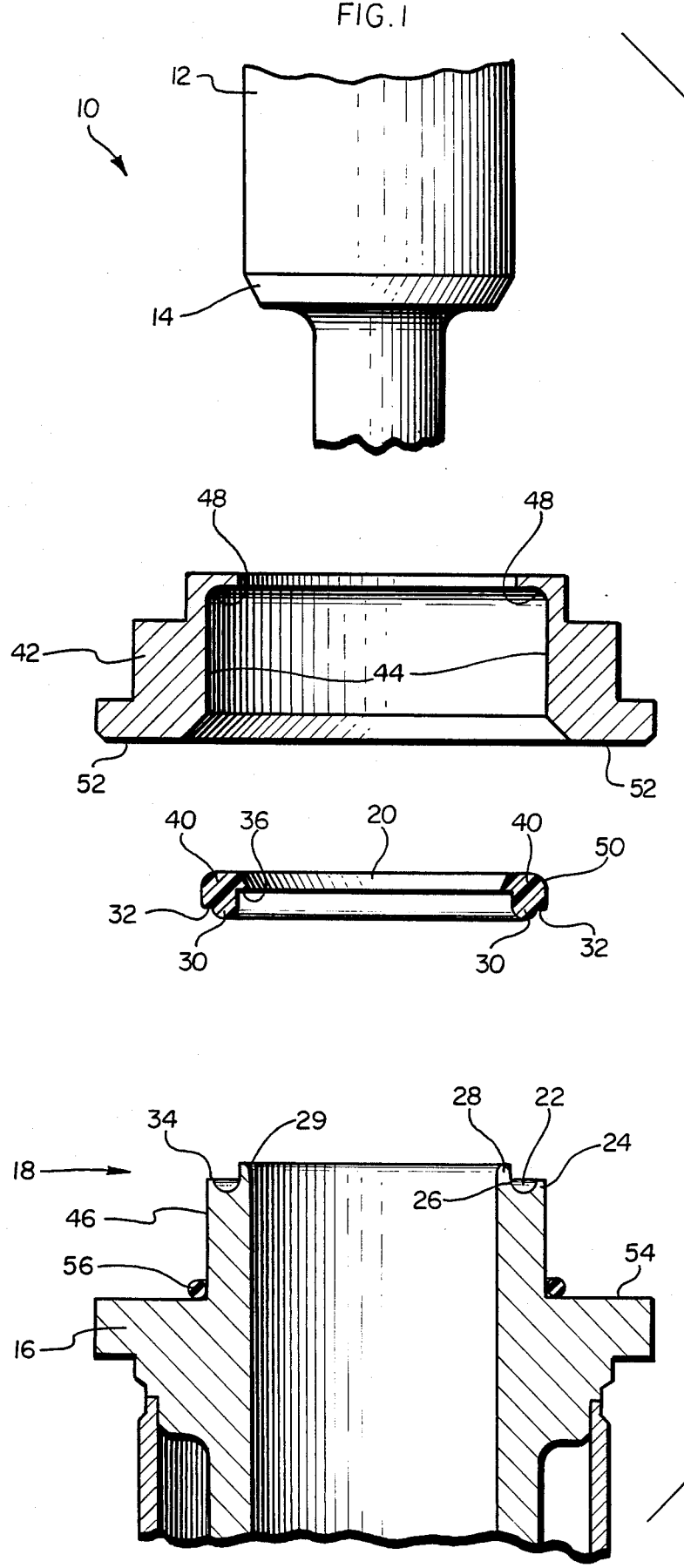
FIG. 1 is an expanded view illustrating a preferred embodiment of a set of valve trim components for a fluid valve in accordance with the principles of the present invention.

FIG. 1 illustrates a set of valve trim components 10 for a high pressure fluid valve in accordance with the principles of the present invention. A valve plug 12 includes an outwardly extending plug seating surface 14. A seal ring housing 16 includes a flexible metal seat 18 at the top of the housing for containing a deformable seal 20 formed of a resilient material such as an elastomer, rubber, synthetic resin polymer, etc. For high pressure applications it is preferred that seal 20 be formed of TFE or other synthetic resin polymer material.

Figure 2:
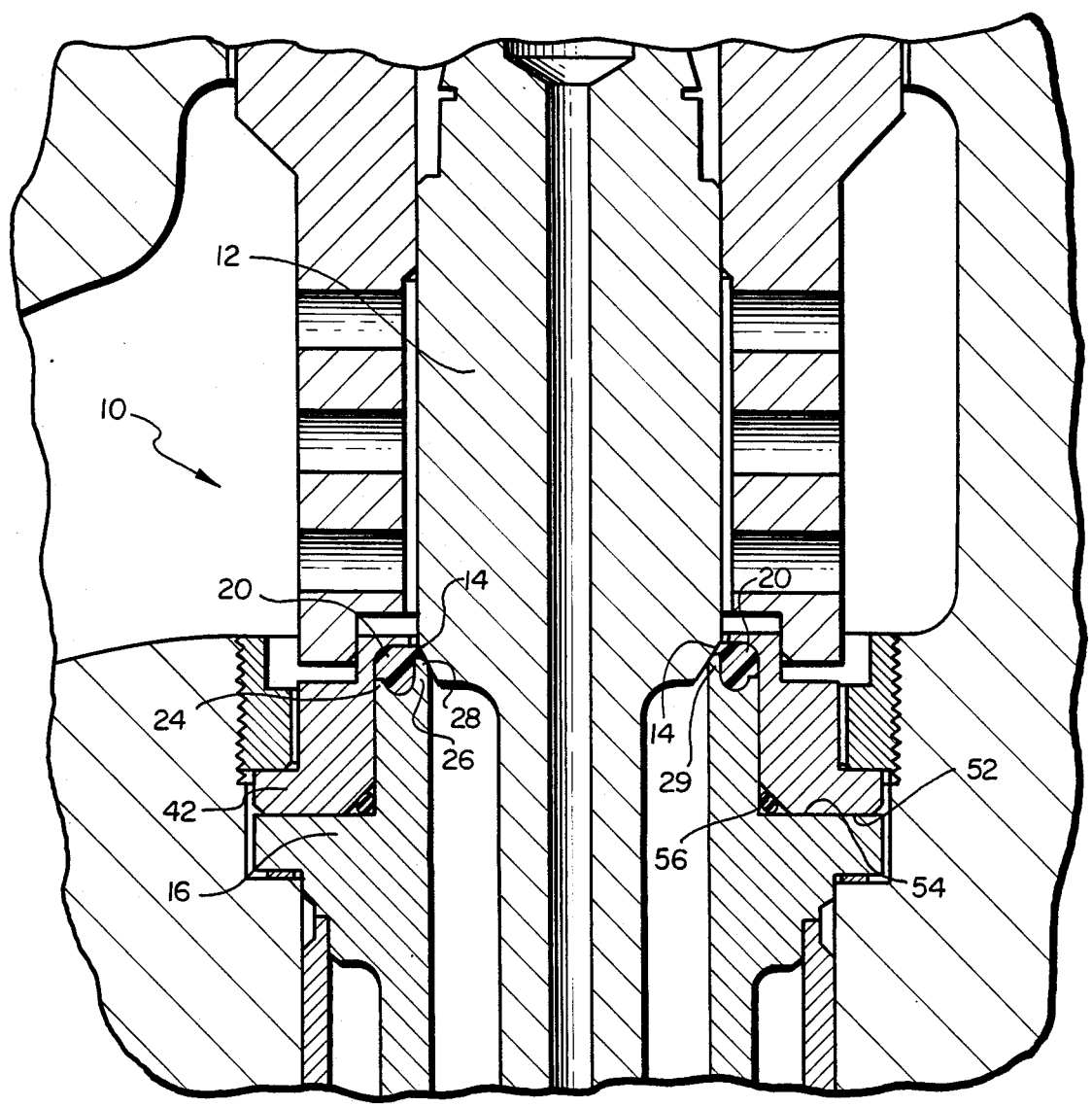
FIG. 2 is a fragmentary sectional view of a valve including the assembled valve trim components as shown in FIG. 1.

The flexible metal seat includes a cavity 22 which is formed and defined between an outer upstanding wall 24 and an inner upstanding wall 26. Wall 26 includes an extension portion projecting upwardly beyond cavity 22 and outer wall 24, and which extension portion ends in a thin, lip portion end 28. Wall 26 and lip portion end 28 are formed so that upon seating contact by valve plug seating surface 14, as shown in FIG. 2, the lip portion will be flexed outwardly. It is preferred that the lip portion end has a small radius to define an arcuate surface 29 which contacts valve plug seating surface 14.

Deformable seal 20 has a lower portion 30 adapted to fit within cavity 22, an outer trim portion 32 which extends slightly over an end 34 of outer wall 24; an inner portion 36 which extends slightly over lip portion end 28; and an upper portion 40 which projects beyond cavity 22 and above lip portion end 28.

A rigid metal seal retainer 42 is adapted to surround the flexible metal seat and the deformable seal. In particular, retainer inner surface 44 is shaped similar to and closely matches the contour of seal ring housing surface 46, and retainer arcuate surface 48 is shaped similar to and closely matches the similar arcuate contour of outer surface 50 of the deformable seal. In addition, the closely matched contour surfaces of the retainer, seal and housing are formed with close dimensional tolerances so that there is a relatively snug fit between these components.

Thus, with reference to FIG. 2, it can be seen that when seal 20 is placed in the flexible metal seat 18, the seal retainer holds the seal in place with a closely matching contour when seal retainer bottom surface 52 abuttingly contacts a ledge 54 of the seal ring housing. O-ring 56 may be provided if desired as an additional seal between retainer 42 and housing 16.

In operation, during closing of the valve, plug 12 is moved towards seal ring housing 16 so that plug seating surface 14 seatingly engages in metal-to-metal sealing contact with flexible lip 28. As the valve plug closes against the metal lip, the lip flexes, thereby squeezing against the seal 20. However, in view of the closely matched contour between seal retainer 42 and the seal 20, seal 20 cannot move outwardly and instead is squeezed inwardly against valve plug seating surface 14. This provides a leak tight seal around the perimeter of the valve plug. Upon opening of the valve, plug 12 is moved away from the flexible metal seat and the seal relaxes.

The deformable seal 20 preferably is made of carbon-filled TFE, so as to allow repeated closings of the valve at temperatures up to 450° Fahrenheit. Other grades of plastic material could be substituted for different temperature requirements and fluids. It is to be understood that while the present invention has been described for use in high pressure valves, where the valve trim is required to provide tight shutoff for long periods of time, the invention may also be used on less demanding situations involving lower pressure differentials and lower temperatures such as gasses or chemicals.

In addition, while the present invention has been illustrated for use in a sliding stem valve, the valve trim itself can also be used in a rotary valve. As an example, the valve trim of the present invention could be adapted for use in a rotary type valve with an off-centered shaft that can rotate a valve plug into the trim seal, instead of merely sliding across the valve opening as in a normal ball valve configuration. The valve plug seating surface thus may be rotated into a flexible metal seat containing a deformable seal rigidly held in place by a surrounding metal seal retainer. A small seat portion may be flexed outwardly to squeeze the deformable seal inwardly against the rotary valve seating surface.

The foregoing detailed description has been given for clearness of understanding only, and no unnecessary limitations should be understood therefrom, as modifications will be obvious to those skilled in the art.

What is claimed is:

1. In a fluid valve for high pressure applications comprising:

a valve plug with a plug metal seating surface;
   a deformable seal ring;
   a seal ring housing having one end opposite said valve plug;
   a cavity within said one end of said seal ring housing opposite said valve plug, said cavity defined by an outer upstanding wall and an opposite inner upstanding wall for containing the deformable seal ring therebetween;
   a flexible seat formed at said one end of the seal ring housing opposite said valve plug and including a flexible metal lip portion for seating engagement with the valve plug metal seating surface, said flexible lip portion extending from said inner upstanding wall outwardly beyond said cavity; and
   a rigid metal seal retainer surrounding the seal ring and metal seat and having inner surface substantially similar to the outer surfaces of the seal ring and the metal seat so that said surfaces are closely matched in contour and said retainer, seal ring and seal ring housing formed with close dimensional tolerances to provide a substantially snug fit engagement therebetween;
   said valve plug metal seating surface engaging and flexing said flexible metal lip portion outwardly to squeeze said deformable seal ring inwardly against and around said valve plug seating surface.

2. In a fluid valve for high pressure applications comprising:

a valve plug with an outwardly extending plug metal seating surface;
   a deformable seal ring;
   a seal ring housing axially aligned with said valve plug and having one end oppositely facing said outwardly extending plug metal seating surface;
   a cavity within said one end of the seal ring housing oppositely facing said outwardly extending plug metal seating surface, said cavity defined by an outer upstanding wall and an opposite inner upstanding wall for containing the deformable seal ring therebetween;
   a flexible metal seat formed at said one end of the seal ring housing and including a flexible metal lip portion for seating engagement with the valve plug metal seating surface, said flexible lip portion extending from said inner upstanding wall outwardly beyond said cavity; and
   a metal seal retainer surrounding the seal ring and metal seat and having inner surfaces substantially similar to the outer surfaces of the seal ring and the metal seat so that said surfaces are closely matched in contour and said retainer, seal ring and seal ring housing formed with close dimensional tolerances to provide a substantially snug fit engagement therebetween;
   said valve plug metal seating surface engaging and flexing said flexible metal lip portion outwardly to squeeze said deformable seal ring inwardly against and around said valve plug seating surface.

3. In a fluid valve for high pressure applications, including a valve plug with an outwardly extending plug seating surface, a deformable, resilient seal ring and a seal ring housing located axially in line with said valve plug, said seal ring housing having a top cavity for receiving said deformable, resilient seal, the improvement comprising:

said seal ring housing top cavity formed by a flexible metal seat including an upstanding inner wall projecting axially upwardly contiguous with and extending beyond said top cavity and ending in a lip portion end for seating engagement contact with said valve plug seating surface;

said upstanding inner wall and lip portion end dimensioned for flexible outward action upon urging of said valve plug seating surface during seating engagement contact thereof;

said deformable, resilient seal ring adapted to fill said cavity and including a top seal portion contoured to be disposed above said lip portion end of said flexible metal seat; and a rigid metal seal retainer axially alignable with said valve plug and said seal ring housing and surrounding said flexible metal seat and said seal ring, said rigid metal seal retainer including an interior portion having a surface contour substantially similar to the surface contour of said seal ring top seal portion to enable said seal ring top seal portion to be squeezingly urged inwardly against said valve plug seating surface in response to said flexible outward action of said metal seat upstanding inner wall and lip portion end during seating engagement by said valve plug seating surface.

4. The improvement of claim 3, wherein metal seal retainer interior portion and said seal ring top seal portion having a substantially similar surface contour also are formed with close dimensional tolerances.

5. The improvement of claim 4, wherein said deformable seal ring is formed of TFE or other synthetic resin polymer material.

6. The improvement of claim 5, wherein said deformable seal includes an inner rim portion which extends over said lip portion end of said flexible metal seat upstanding inner wall.

7. The improvement of claim 6, wherein said flexible metal seat further includes an outer upstanding wall opposite said inner upstanding wall to define said cavity between.

8. The improvement of claim 7, wherein said inner upstanding wall extends beyond said outer upstanding wall.

9. The improvement of claim 8, wherein said deformable seal includes an outer rim portion which extends over said outer upstanding wall.

10. The improvement of claim 4, wherein said lip portion end includes an arcuate surface for seating engagement contact with said valve plug seating surface.

11. The improvement of claim 4, wherein said metal seal retainer interior portion and said seal ring top seal portion are formed with matching arcuate surface contours.

* * * * *

UNITED STATES PATENT AND TRADEMARK OFFICE
CERTIFICATE OF CORRECTION

PATENT NO. : 4,834,338

DATED : May 30, 1989

INVENTOR(S) : James R. Davis

It is certified that error appears in the above-identified patent and that said Letters Patent is hereby corrected as shown below:

On the title page,
in the abstract, line 9, change "squeezed outwardly" to --squeezed inwardly--.

Col. 1, line 64, change "a deformable sealing" to --a deformable seal ring--.

Col. 4, line 17, change "having inner surface" to --having inner surfaces--.

Signed and Sealed this

Fifteenth Day of May, 1990

Attest:

HARRY F. MANBECK, JR.

*Attesting Officer*  *Commissioner of Patents and Trademarks*